H. & C. HEZINGER.
CARBURETER.
APPLICATION FILED MAY 17, 1911.

1,028,723.

Patented June 4, 1912.

WITNESSES
F. E. Alexander
C. F. Murdock

INVENTORS
Hugo Hezinger
Carl Hezinger
BY
ATTORNEYS

UNITED STATES PATENT OFFICE.

HUGO HEZINGER, OF BALDWIN, AND CARL HEZINGER, OF NEW YORK, N. Y.

CARBURETER.

1,028,723.  Specification of Letters Patent.  Patented June 4, 1912.

Application filed May 17, 1911. Serial No. 627,826.

*To all whom it may concern:*

Be it known that we, HUGO HEZINGER, a resident of Baldwin, in the county of Nassau and State of New York, and CARL HEZINGER, a resident of the city of New York, borough of Manhattan, in the county and State of New York, both subjects of the German Emperor, have invented a new and Improved Carbureter, of which the following is a full, clear, and exact description.

Among the principal objects which the present invention has in view are: To provide a carbureter adjustable to vary the ratio or proportion of air and gasolene admitted to the carbureting chamber; to provide a carbureter wherein the end of a float valve is dispensed with by arranging the parts in such manner that the operation of the throttle mechanism governs the admission of air to the chamber proportioned to the gasolene admitted; to provide a pin valve to control the supply of gasolene to the carbureting chamber; to provide a manually operative cut-off valve for the gasolene; and to provide a construction and arrangement for the carbureting chamber wherein is prevented the accumulation or surplus of gasolene in said chamber.

One embodiment of the present invention is disclosed in the structure illustrated in the accompanying drawings, in which like characters of reference denote corresponding parts in all the views, and in which—

Figure 1:
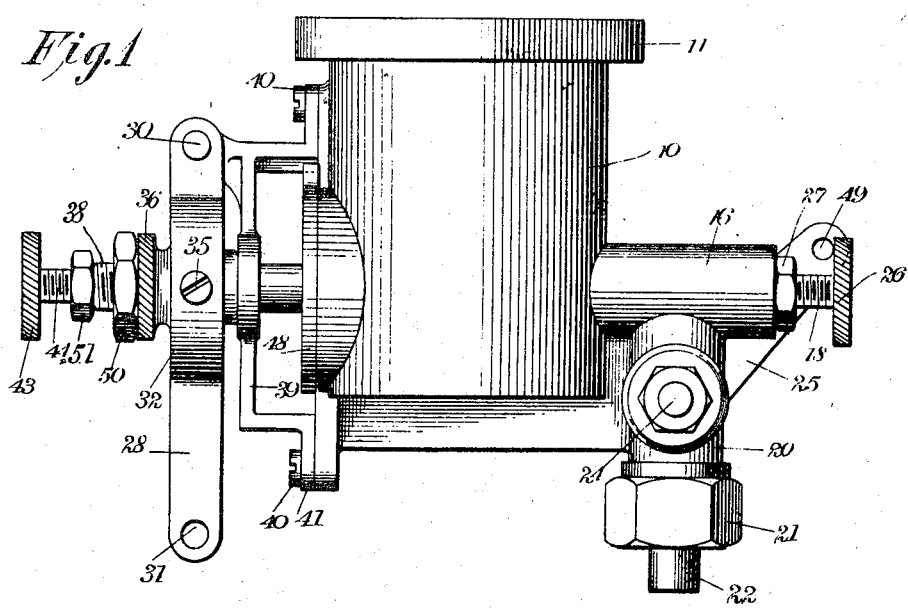
Figure 2:
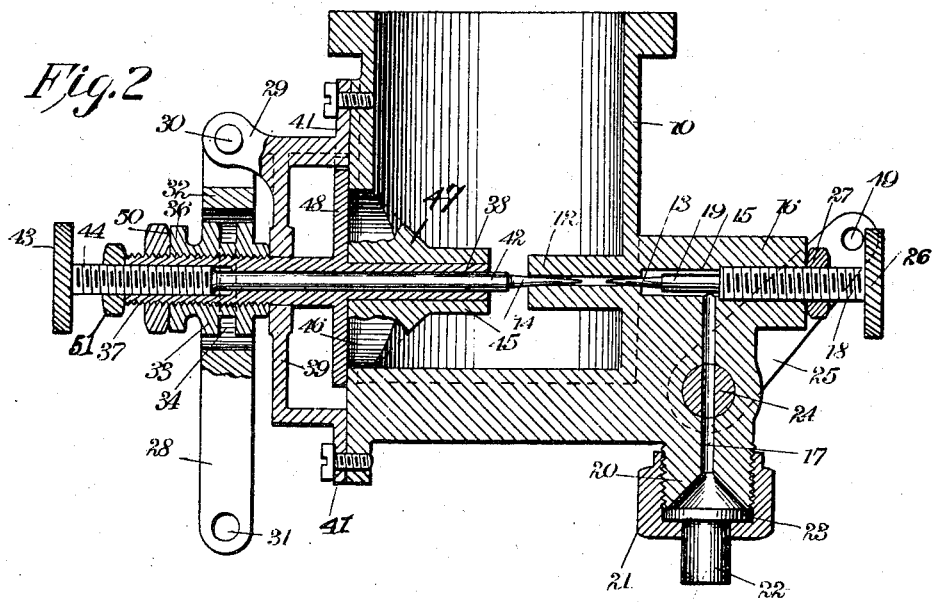

Figure 1 is a side elevation of a carbureter constructed and arranged in accordance with the present invention; Fig. 2 is a longitudinal vertical section taken on the line 2—2 in Fig. 3.

As seen in the accompanying drawings, the carbureting chamber is formed within the pendant cylinder 10 which is provided at the upper edge with a bolting flange 11. The cylinder 10 is provided with an inlet tube 12, the orifice whereof is trued to form seats for the pin valves 13 and 14. The tube 12 extends within the chamber above the bottom thereof and separated therefrom, as best seen in Fig. 2 of the drawings. The opening of the tube 12 communicates with a bore 15 formed in the boss 16 extended from the side of the cylinder 10. The bore 15 is in open communication with the diminished channel 17 the lower end whereof is coned, as shown in Fig. 2 of the drawings. The bore 15 is provided with suitable screw threads to register with the screw threaded section 18 of the plunger 19. The plunger 19 is in diameter less than the bore 15 to form a surrounding passage communicating between the channel 17 and the opening in the tube 12.

The lower end of the nipple 20 wherein is formed the channel 17 is threaded to register with the threads of the gland nut 21. The gland nut 21 is provided for connecting the nipple 20 with the supply pipe 22, for this purpose cramping between the flange of the said nut and the end of the nipple 20 the flange 23 provided on the said pipe 22. The admission of the gasolene as delivered from the pipe 22 to the carbureting chamber is primarily controlled by a plug valve 24, in the plug whereof is formed a channel to register with the extension of the channel 17 when the lever 25 is disposed as shown in Fig. 2 of the drawings. The passage of the gasolene from the bore 15 to the opening in the tube 12 is controlled by the pin valve 13 as the same is moved to and from the said tube 12. To move the pin valve 13 the screw section 18 is rotated, for this purpose being provided with a knurled disk head 26.

Observing the construction thus far described it will be seen that the maximum flow of gasolene into the opening in the tube 12 may be set by manipulating the head 26 until the proper quantity is being delivered under what may be termed full open position. The determination of the pin valve 13 having been arrived at the lock nut 27 is tightened on the section 18 against the end of the boss 16, thus locking the plunger 19 and pin valve 13 carried thereby rigidly in position. By this arrangement the maximum supply of gasolene delivered to the carbureting chamber is varied and controlled.

It will also be observed that by means of the lever 25, which may be operated from the chauffeur's position, the gasolene supply may be completely determined. In this manner when the car is brought to a stand the usual reliance on the throttle valve is dispensed with, the supply of gasolene being completely cut off by the manipulation of the valve 24. Accidental flooding of the carbureting chamber and accidents and damage incident thereto are thereby avoided.

What is herein termed the operating control of the gasolene and explosive mixture produced in the carbureter is manipulated by the chauffeur to vary the opening of the pin valve 14.

Primarily the valve 14 is inserted and withdrawn from the opening of the tube 12 by the movement of the lever 28. The lever 28 is pivotally connected to the bracket 29 by the pin 30. The opposite end of the lever 28 is provided with an eyelet 31 to which is engaged the connecting link or rod for rocking the said lever on the pin 30. The lever 28 is provided with a ring section 32 to span the nut 33, the opening of the ring being sufficient to permit the necessary movement of the said lever 28. The nut 33 is provided with an annular groove 34 into which is extended the reduced ends of spanner screws 35, as shown best in Fig. 1 of the drawings. The nut 33 is provided with a knurled head 36 whereby the said nut may be advanced or retracted on the threaded section 37 of the containing tube 38. The nut 33 forms a stop for the inward swing of the lever 28. The end of the said nut normally rests against the side of the bridge 39. The bridge 39 is integrally formed with the bracket 29 and is fastened upon the cylinder 10 by screws 40 which pass through the feet 41 formed on the said body, as seen best in Fig. 1 of the drawings.

The tube 38 operates as a guide for the plunger 42, upon the end whereof is formed the pin valve 14. The plunger 42 is provided at the outer end with a knurled head 43, and intermediate the plunger 42 and the head 43 is a screw threaded section 44 the threads whereof register with the threads formed within the tube 38. The tube 38 is held in fixed position by the lock nut 51.

The tube 38 is supported within the tube 45. The tube 45 is integrally formed with the cylinder 10, being suspended concentric with the opening 46 formed in the said cylinder and therein held by the spider webs 47, as seen best in Fig. 2 of the drawings. The opening 46 is provided to admit air to the carbureting chamber, and is closed by a valve 48. The valve 48 is integrally formed on the tube 38 to move therewith to and from the said opening 46.

As best seen in Fig. 2 of the drawings, the bottom of the carbureting chamber is on a level with the edge of the opening 46. This insures against the accumulation within the chamber of an undesirable amount of gasolene. In the operation of the valve 48 the same is closed only when the throttle valve is disposed to completely close the delivery end of the opening through the tube 12.

When the lever 25 is operated from the chauffeur's seat of an automobile or similar machine, the eyelet 49 formed in the end thereof is suitably connected with the operating lever such as is usually provided for machines of this character.

The operation of the invention is as follows: It will be understood that when the machine for which the carbureter is provided is stopped the lever 25 is so turned that the valve 24 completely closes the channel 17, therefore on starting the machine the first act of the operator is to lift the lever 25 to the position shown in Fig. 2 of the drawings to register the opening through the valve 24 with the extension of the channel 17. Gasolene now flows into the opening through the tube 12. In the fully stopped position, under normal conditions, the pin valve 14 closes the delivery opening of the tube 12. It therefore becomes necessary to retract the lever 28 and therewith the tube 38 and plunger 42. Sufficient gasolene is thus admitted to the carbureting chamber to produce the explosive mixture needed to start the engine. If it is required that the carbureter shall be primed, this may be accomplished by manipulating the head 43 to withdraw the pin valve from the delivery opening of the tube 12 while the valve 48 remains closed. This would admit an excess amount of gasolene to the carbureter to overenrich the mixture, and combining with the air in the carbureter form a preliminary or initial over-rich charge. If the carbureter has been primed it becomes necessary to regulate the carbureter to give a uniform mixture. Under heavy load conditions the head 26 and plunger 19 connected therewith are manipulated until there is ascertained and provided a proper flow of gasolene from the bore 15 through the tube 12. This being ascertained the lock nut 27 is tightened and the supply of gasolene is from thenceforward fixed. The operating conditions for the carbureter are now adjusted. This is accomplished by manipulating the head 36 to adjust the nut 33 to bear against the bridge 39 to limit the inward throw of the lever 28 and thereby prevent the total closure of the valve 48. During the adjustment of the nut 33 to regulate the closed position of the valve 48 it will be understood that the plunger 42 is retracted to give the full open position of the tube 12. In this position of the valve 48 the nut 33 is locked by tightening against the head 36 of the said nut 33 the lock nut 50. The valve 48 being thus set the plunger 42 is moved inward by manipulating the head 43 until the delivery opening of the tube 12 is completely closed. The carbureter is now set for operation during the run of the machine. It will be noted that as the lever 28 is moved to and from the cylinder 10 the tube 38 sliding in the tube 45 and bridge 39, the valve 48 is lifted and the pin valve 14 retracted simultaneously. It will be found that the ratio of proportion of the two openings is such that as the valves are brought to their widest open position the air delivery is increased to the maximum, gradually reducing the richness of the explosive fuel to compensate for the increased or high speed conditions.

It will be observed that in the present construction the usual float valve is dispensed with. Also it will be seen that between the cylinder and the gasolene inlet to the carbureting chamber, there is interposed neither a throttle nor other form of control. Therefore, the present construction offers the advantage of simplicity coupled with efficiency and durability.

Having thus described our invention, what we claim as new and desire to secure by Letters Patent is:—

A carbureter such as described, having a bucket-shaped mixing chamber provided in the side wall thereof with an air supply opening; a gasolene supply pipe having an inlet opening into said chamber oppositely disposed to and in line with the center of said opening; a closure valve for said opening suitably mounted on said chamber; means for manually operating said closure valve to expose and close said air supply opening; a needle valve carried by said closure valve and adapted to close the inlet opening of said gasolene supply pipe; and means for adjusting the said needle valve on the said closure valve to move therewith to regulate the extent of closure of the said gasolene supply pipe in relation to the closure of the said air supply opening.

In testimony whereof we, HUGO HEZINGER and CARL HEZINGER have signed our names to this specification in the presence of two subscribing witnesses.

HUGO HEZINGER.
CARL HEZINGER.

Witnesses:
  E. F. MURDOCK,
  PHILIP D. ROLLHAUS.